United States Patent [19]

Gane et al.

[11] Patent Number: 5,322,879
[45] Date of Patent: Jun. 21, 1994

[54] PROCESS FOR PREPARING A TREATED PAPER COATING PIGMENT

[75] Inventors: Patrick A. C. Gane, Callington; Christopher R. L. Golley, St. Austell, both of United Kingdom

[73] Assignee: ECC International Limited, United Kingdom

[21] Appl. No.: 988,727

[22] Filed: Dec. 10, 1992

[30] Foreign Application Priority Data

Dec. 13, 1991 [EP] European Pat. Off. ........ 91311627.3

[51] Int. Cl.$^5$ ............................................. C08K 3/34
[52] U.S. Cl. .................................... 524/446; 524/447; 106/487
[58] Field of Search ................... 524/445, 446, 447; 106/486, 487

[56] References Cited

U.S. PATENT DOCUMENTS

| | | | |
|---|---|---|---|
| 4,075,030 | 2/1978 | Bundy et al. | 106/416 |
| 4,076,548 | 2/1978 | Bundy et al. | 106/486 |
| 4,078,941 | 3/1978 | Bundy et al. | 106/109 |
| 4,106,949 | 8/1978 | Malden | 106/487 |
| 4,929,580 | 5/1990 | Jones | 106/487 |
| 5,057,467 | 10/1991 | Croft | 106/487 |

FOREIGN PATENT DOCUMENTS

| | | |
|---|---|---|
| 0227443 | 7/1987 | European Pat. Off. . |
| 0245553 | 11/1987 | European Pat. Off. . |
| 0260945 | 3/1988 | European Pat. Off. . |
| 2249753 | 11/1974 | France . |
| 1481307 | 7/1977 | United Kingdom . |
| 2184717 | 7/1987 | United Kingdom . |

OTHER PUBLICATIONS

"Chemically Induced Kaolin Floc Structures for Improved Papercoating", Bundy et al. 1983 Coating Conference, TAPPI Proceedings, pp. 175-187.

"Effect of Kaolin Pigment Particle Size and Shape on Rotogravure Print Quality", Senate, et al. TAPPI, May 1982, vol. 65, No. 5, pp. 95-99 European Search Report.

*Primary Examiner*—Paul R. Michl
*Assistant Examiner*—Peter Szekely
*Attorney, Agent, or Firm*—Klauber & Jackson

[57] ABSTRACT

There is disclosed a paper coating composition comprising, in aqueous suspension, an adhesive and a treated paper coating pigment prepared by the following process:

(i) suspending a paper coating pigment in water to form a suspension containing at least 5% by weight of the pigment, the pH being adjusted, if necessary, to lie below 7.5;

(ii) mixing with the suspension formed in step (i) a water-soluble organic compound having a plurality of primary and/or secondary amine groups and a number average molecular weight not greater than 1000; and (iii) at least partially dewatering the mixed suspension resulting from step (ii) to form a dewatered suspension of a treated paper coating pigment containing not more than about 30% by weight water;

characterized in that the water soluble organic compound is added in step (ii) in an amount sufficient to decrease the 5 poise viscosity concentration of an aqueous suspension of the treated pigment relative to that obtained with the untreated pigment. The paper coating composition is particularly suited to the preparation of a coated paper which is to be printed on by a gravure technique.

11 Claims, No Drawings

PROCESS FOR PREPARING A TREATED PAPER COATING PIGMENT

This invention relates to an improved inorganic pigment for incorporation into paper coating compositions, and in particular to compositions used in preparing coated papers for use in the rotogravure printing process. Herein, the term "paper" is used to describe any fibrous web having a surface which receives a coating composition, and includes materials such as board.

In the rotogravure printing process a sheet of paper is brought into close contact with a cylinder having a smooth, polished metallic surface into which is etched or indented a matrix of pits or cells which are arranged in a regular, fine grid pattern such that the spacing between adjacent cells is of the order of 100–150 μm. The parts of the cylinder which are required to give a solid black or coloured print impression are strongly etched to give deep cells which contain a relatively large quantity of ink, while the parts of the cylinder which are required to give a half tone print impression are less strongly etched and parts which represent white areas are substantially unetched. In order to obtain good quality printing by the rotogravure process it is important that the surface of the paper makes contact with the surface of the cylinder over the whole area over which they coincide. If the paper surface is not in close contact with the cylinder in the vicinity of a particular cell, the ink may not be drawn from the cell on to the paper and the result is a "missing dot". If a large number of cells fail to transfer their ink to the paper in this way, the print impression has a speckled appearance. Attention is hereby drawn to the following references which describe the gravure printing process generally:

McGraw Hill Encyclopaedia of Science & Technology, pages 603 to 605, 617 and 622 — General articles on intaglio printing; "Pulp and Paper — Chemistry and Chemical Technology" by James P. Casey, 2nd ed., Volume III, Interscience Publishers, Inc., New York, 1961, pages 1806 to 1812; "Handbook of Pulp and Paper Technology" by Kenneth W. Britt, 2nd ed., Van Nostrand Reinhold Co., New York, 1970, pages 683 to 688; "The Printing Ink Manual" by R. H. Leach et al., 4th ed., Van Nostrand Reinhold (International) Co. Ltd., England, 1988, page 35 et seq..

Good contact between the paper and the printing cylinder has hitherto been achieved by coating the paper with a composition comprising a relatively coarse particulate inorganic white pigment and a self-thickening, or alkali-swelling latex adhesive. Some or all of the constituent particles of the latex swell or expand as the pH of the composition is raised to about 8–9. This behaviour is shown typically by some latices of the acrylic type. A coating derived from a composition of the above type is compressible; accordingly when a sheet of paper coated with the composition passes through the nip between the printing cylinder and the backing roll in a printing machine, the coating deforms to correspond more precisely to the surface of the cylinder.

A relatively coarse pigment is chosen because it forms a coating having a relatively large number of cavities or voids which are able to accommodate the swollen latex particles. If a pigment were chosen which had a relatively large proportion of ultrafine particles, i.e. having an equivalent spherical diameter smaller than 0.25 μm, these ultrafine particles would tend to fill the voids and render the coating less compressible.

Although a composition comprising a combination of a relatively coarse pigment and an alkali-swelling latex is advantageous in preparing a coated paper for rotogravure printing because it is compressible and gives good rotogravure print quality, it has the disadvantage that it is generally not possible to provide a surface of high gloss. In order to provide a glossy surface it is generally necessary for the pigment to be substantially free of particles having an equivalent spherical diameter larger than about 2 μm, because such coarser particles are generally responsible for roughness in the surface of the coating which impairs the gloss. It has not hitherto been possible to provide a pigment for a rotogravure coating composition which gives at the same time good print quality and good gloss.

GB-A-1481307 relates primarily to a process for treating an aqueous suspension of a clay mineral so as to improve the rheological properties of the clay mineral when in aqueous suspension. The clay mineral, in aqueous suspension at a solids content of 5–30% by weight, is first treated with a minor proportion by weight of a water-soluble organic compound having a plurality of basic groups and a number average molecular weight not greater than 1000 and subsequently dewatered. The preferred water-soluble organic compound is polyethylene imine having a number average molecular weight in the range of from 400 to 1000. It is also preferred that the water-soluble organic compound added to the aqueous suspension of the clay mineral is used in an amount no greater than about 0.25% by weight, based on the weight of the dry clay mineral. It is found that this treatment enables the clay mineral to be formed into an aqueous suspension having a viscosity at a given solids content which is reduced when compared with the untreated clay mineral. A further improvement in the theological properties of the clay mineral may be obtained by subjecting the treated clay to high energy mechanical working. An aqueous suspension of the treated clay mineral may be combined with an adhesive to form a paper-coating composition.

GB-A-2184717 takes the teaching of GB-A-1481307 further by recommending that the water-soluble organic compound is added to the clay mineral when in a plastic state (e.g. 50–78 wt % solids) at the stage of mechanically working the clay, rather than to a fluid aqueous suspension of the clay mineral. GB-A-2184717 teaches that this permits the formation of a mechanically-worked clay mineral having a higher solids content than that achieved by the technique described in GB-A-1481307 and that this leads to a saving in overall energy consumed in dewatering and drying of the clay mineral.

The present invention seeks to provide a pigment for a rotogravure coating composition which gives a print quality at least as good as that which is generally provided by the known, relatively coarse, pigments, but a greatly increased gloss value. It has been found that a clay mineral treated with a specific quantity of a water-soluble organic compound, but not subsequently being subjected to a high energy mechanical working step, gives surprising results when made up into a high-solids paper-coating composition for a rotogravure printing paper (i.e. a paper for use in a rotogravure printing process).

In accordance with a first aspect of the present invention, there is provided a paper coating composition comprising, in aqueous suspension, an adhesive and a treated paper coating pigment prepared by the following process:

(i) suspending a paper coating pigment in water to form a suspension containing at least 5% by weight of the pigment, the pH being adjusted, if necessary, to lie below 7.5;

(ii) mixing with the suspension formed in step (i) a water-soluble organic compound having a plurality of primary and/or secondary amine groups and a number average molecular weight not Greater than 1000; and (iii) at least partially dewatering the mixed suspension resulting from step (ii) to form a dewatered suspension of a treated paper coating pigment containing not more than about 30% by weight water;

characterised in that the water soluble organic compound is added in step (ii) in an amount sufficient to decrease the 5 poise viscosity concentration of an aqueous suspension of the treated pigment relative to that obtained with the untreated pigment.

In a preferred embodiment of the first aspect of this invention, the water soluble organic compound is added in step (ii) in an amount sufficient to decrease the 5 poise viscosity concentration of an aqueous suspension of the treated pigment by at least 4 percentage units relative to that obtained with the untreated pigment.

In accordance with a second aspect of the present invention, there is provided a process for preparing a treated paper coating pigment comprising the following steps:

(i) suspending a paper coating pigment in water to form a suspension containing at least 5% by weight of the pigment, the pH being adjusted, if necessary, to lie below 7.5;

(ii) mixing with the suspension formed in step (i) a water-soluble organic compound having a plurality of primary and/or secondary amine groups and a number average molecular weight not greater than 1000; and (iii) at least partially dewatering the mixed suspension resulting from step (ii) to form a dewatered suspension of a treated paper coating pigment containing not more than about 30% by weight water;

characterised in that the water soluble organic compound is added in step (ii) in an amount sufficient to decrease the 5 poise viscosity concentration of an aqueous suspension of the treated pigment by at least 4 percentage units relative to that obtained with the untreated pigment.

In accordance with a third aspect of the present invention, there is provided the use as a coating pigment for a gravure paper, a treated paper coating pigment prepared by a process comprising the following steps:

(i) suspending a paper coating pigment in water to form a suspension containing from 5% to 30% by weight of the pigment, the pH being adjusted, if necessary, to lie within the range of from 2.5 to 7.5;

(ii) mixing with the suspension formed in step (i) a water-soluble organic compound having a plurality of primary and/or secondary amine groups and a number average molecular weight not greater than 1000; and (iii) at least partially dewatering the mixed suspension resulting from step (ii) to form a dewatered suspension of a treated paper coating pigment containing not more than about 35% by weight water;

characterised in that the water soluble organic compound is added in step (ii) in an amount sufficient to decrease the 5 poise viscosity concentration of an aqueous suspension of the treated pigment relative to that obtained with the untreated pigment.

In a preferred embodiment of the third aspect of this invention, the water soluble organic compound is added in step (ii) in an amount sufficient to decrease the 5 poise viscosity concentration of an aqueous suspension of the treated pigment by at least 4 percentage units relative to that obtained with the untreated pigment.

The paper coating composition of the present invention may comprise as little as 10% by weight (or even less) of the pigment in some of the more exotic coating methods; however, for the most commonly used coating methods, the composition will contain in the range of from 40 to 70% by weight of the pigment. The precise value will, of course, depend upon the pigment used, the coating method employed, the speed of the web through the coating machine and other factors known to the skilled person.

The adhesive used in the paper coating composition will normally be of the latex variety and a self-thickening or alkali-swelling latex adhesive is preferred in the present invention; it is possible, however, to employ a non-swelling latex, for example a styrene-butadiene latex or a mixture of the two types of latex in any proportion. The amount of latex employed will normally be in the range of from 4 to 8 parts by weight to every 100 parts by weight of the inorganic material.

In making up a paper coating composition of the present invention, the latex and the pigment are first prepared as dispersed suspensions. The respective dispersants should be chosen such that the pigment dispersion remains stable in the presence of the latex. The dispersant for the pigment may conveniently be a water soluble salt of a poly (acrylic acid) or of a poly (methacrylic acid) having a number average molecular weight of less than 10,000 and preferably in the range from 1,000 to 5,000. The amount of the dispersant used is in the range from 0.05% to 5.0% by weight, based on the weight of dry pigment. Preferably the amount is in the range from 0.2% to 0.5% by weight, based on the weight of dry pigment.

In accordance with a fourth aspect of the present invention, there is provided a coated paper prepared by coating a base paper with a paper coating composition in accordance with the first aspect of the present invention and allowing the wet coated paper to dry.

It has been found that a paper in accordance with the fourth aspect of this invention is especially suited to being printed upon using a gravure technique. In particular, papers in accordance with the present invention have been found to have a gravure print quality (defined as percentage missing dots - see below) no greater than, and an opacity no less than, the equivalent results obtained using a known paper coating pigment prepared in accordance with GB-2058734, and a gloss which is significantly superior.

(The "gravure print quality" as used herein is a measure of the suitability of a paper to rotogravure printing. To determine the "gravure print quality" of a paper, a gravure printing test cylinder is used with an area of deeply etched cells to give a solid black area, and an area of less deeply etched cells to give a half-tone area. The half-tone area is used to estimate the percentage of gravure printing dots which are missing from the test print. This percentage is expressed as the "gravure printing quality". This test method is described in detail in the article "Realistic paper tests for various printing processes" by A. Swan, published in "Printing Technology", Vol. 13, No. 1, April 1969, pages 9–22.)

In step (i) of the method for preparing the paper coating pigment, the white particulate inorganic material is preferably a clay mineral of the kandite type, for example kaolinite, dickite, nacrite or halloysite. Most preferably the inorganic material is a kaolinitic clay having a particle size distribution such that from 65 to 80% by weight consists of particles having an equivalent spherical diameter smaller than 2 µm and from 10 to 30% by weight consists of particles having an equivalent spherical diameter smaller than 0.25 µm. Advantageously the kaolinitic clay has a relatively high aspect ratio. The individual particles of a kaolinitic clay are generally in the form of hexagonal plates or stacks of hexagonal plates, and the aspect ratio of a particle may be defined as the ratio of the diameter of a circle having the same area as the face of a particle to the thickness of the particle. The mean aspect ratio of the particles of the kaolinitic clay is preferably in the range from 5 to 20.

Preferably the suspension contains no more than 35% by weight of the dry inorganic material, more preferably from 8% to 20% by weight of the dry inorganic material, and the pH is preferably at least 2.5 and most preferably in the range from 3.5 to 5.5.

As stated above, the water soluble organic compound is added in step (ii) in an amount sufficient to decrease the 5 poise viscosity concentration of an aqueous suspension of the treated pigment relative below that obtained with the untreated pigment. It will be appreciated, therefore, that the quantity required will vary depending upon the specific pigment employed. By way of guidance, however, the quantity of the water-soluble organic compound will normally be at least 0.05% by weight and is unlikely to be greater than 1% by weight, based on the weight of dry inorganic material and it will usually be in the range of from 0.3% to 0.50% by weight, based on the weight of dry inorganic material. The present invention should here be contrasted with the teaching of GB-1481307 in which a water-soluble organic compound is used to treat a clay mineral so as to improve the rheological properties of the clay mineral in aqueous suspension and result in a treated pigment which has an increased 5 poise viscosity concentration relative to that obtained with the untreated pigment. It is believed that this improvement in rheological properties comes about as a result of the water-soluble organic compound used binding together fine particles of montmorillonite clay impurity in the feed, which otherwise has a detrimental effect on the rheology of the clay. The organic compound is therefore added in relatively small quantities to ensure that the 5 poise viscosity concentration is increased relative to the untreated clay.

Preferably the water-soluble organic compound has a number average molecular weight in the range of from 50 to about 600 and may be, for example, a polyethyleneimine, ethylene-diamine, or a polyethylene amine of relatively short chain length such as diethylenetriamine, tetraethylenepentamine or 1:12 dodecanediamine or hexamethylenetetramine. A polyethylene diamine which is prepared by the condensation of ethylenediamine with an ethylene dihalide or with formaldehyde has been found to be especially suitable. The water-soluble organic compound is preferably added to the suspension of the inorganic material in an aqueous solution containing from 0.1 to 20% by weight of the organic compound, and most preferably from 0.5 to 5% by weight of the organic compound.

In step (iii) of the method for preparing the paper coating composition, the suspension of the inorganic material which has been treated with the organic compound may be dewatered by means of a centrifuge or by filtration, and the cake produced by the centrifuge or by filtration may be further dried by thermal evaporation. The water content of the treated inorganic material is preferably reduced to not more than about 20% by weight. A high pressure filtration device, such as, for example, a tube pressure filter of the type described in GB-A-1240465 is especially convenient because it can be used to reduce the water content of the treated inorganic material to below 20% by weight in one step under the action of the applied pressure.

According to a fifth aspect of the present invention, there is provided a printing process in which an ink is printed onto a paper in accordance with the fourth aspect of the present invention employing a gravure, preferably a rotogravure printing technique.

A rotogravure printing technique is one in which a sheet of paper is brought into close contact with a cylinder having a smooth, polished metallic surface into which is etched or indented a matrix of pits or cells which are arranged in a regular, fine grid pattern such that the spacing between adjacent cells is of the order of 100–150 µm. The parts of the cylinder which are required to give a solid black or coloured print impression are strongly etched to give deep cells which contain a relatively large quantity of ink, while the parts of the cylinder which are required to give a half-tone print impression are less strongly etched and parts which represent white areas are substantially unetched.

Without wishing to be bound by any theory, it is currently believed that the treatment of the inorganic material with the organic compound causes the ultra-fine (smaller than 0.25 µm) particles of the inorganic material to coalesce to form aggregates and that the subsequent dewatering step stabilises the aggregates so that they are relatively resistant to mechanical agitation to which the material may be exposed in subsequent mixing operations and during the paper coating process. As a result, once the clay mineral has been treated with the water-soluble organic compound, it should not be subjected to any deliberate mechanical working, such as kneading or pugging in a pugmill. By "deliberate mechanical working", we mean any step (or series of steps) which dissipates in the aqueous suspension of the clay mineral more than 25 kJ of energy per kg of dry clay mineral.

In particular, it is believed that the aggregated material, when present as a coating on a sheet of base paper, is more porous than the untreated material and therefore provides a compressible coating on paper when mixed with a suitable latex adhesive. Moreover, use of the treated material makes it possible to provide a coated paper for rotogravure printing which has a good glossy surface.

It has also been found that the treated pigment of the present invention may be employed advantageously in a paper coating composition comprising a mixture of pigments and still give rise to a coated paper which has the aforementioned gravure printing advantages. In particular, it has been found that if the other pigment is one which would not normally be expected to give good gravure printing results, such as one having a relatively high proportion of fine particles less than 0.25

μm, the overall combination of pigments does not manifest the disadvantages which might otherwise be expected to arise. Preferably, the treated pigment of the invention should represent at least 40% of the total weight of pigment in the mixture of pigments.

The invention will now be illustrated by reference to the following Examples.

EXAMPLE 1

An aqueous suspension was prepared containing 17.9% by weight of an English kaolin clay which had a particle size distribution such that 78.5% by weight consisted of particles having an equivalent spherical diameter smaller than 2 μm, 62.7% by weight consisted of particles having an equivalent spherical diameter smaller than 1 μm and 21.8% by weight consisted of particles having an equivalent spherical diameter smaller than 0.25 μm. The suspension was treated with sufficient sulphuric acid to reduce the pH of the suspension to 3.6 in order to flocculate the clay.

The suspension was then divided into three portions A, B and C of which portion A was treated with 0.16% by weight, based on the weight of dry kaolin, of a polyethylene diamine of molecular weight about 200, which had been prepared by condensing ethylene diamine with ethylene dichloride; portion B was treated with 0.48% by weight, based on the weight of dry kaolin, of the same polyethylene diamine; and portion C received no further treatment. In each case the polyethylene diamine was added in the form of a 2% by weight solution in water. Portions A and B were each stirred for 10 minutes after the addition of the polyethylene diamine to ensure thorough mixing.

Each portion was then filtered and the filter cake dried to zero moisture. The treated clays A and B were found to give a 5 poise viscosity concentration in aqueous suspension at least 4 percentage units lower than that obtained with the untreated clay C. (The 5 Poise viscosity concentration is the percentage by weight of dry pigment (here kaolin) in a fully deflocculated aqueous suspension which has a viscosity of 5 Poise at 22° C.)

The dried kaolin produced from each portion of suspension was then formed into a paper coating composition, suitable for preparing a coated paper for use in the rotogravure printing process, according to the formula:
(i) 100 parts by weight kaolin;
(ii) 4.5 parts by weight alkali-swelling, self-thickening acrylic latex; and
(iii) sufficient sodium hydroxide to raise the pH to 9.0

Each composition was prepared by adding slowly to water containing 0.3% by weight, based on the weight of dry kaolin, of a sodium polyacrylate dispersing agent, sufficient kaolin to form a suspension containing 62% by weight of kaolin, in a mixer provided with a stirrer rotating at 400 rpm. Stirring was continued until the kaolin was fully dispersed, at which point the latex was added and mixed into the composition.

Samples of the composition were coated on to a rotogravure base paper of weight 34 gm$^{-2}$ using a laboratory coating apparatus of the type described in GB-A-2225261, at a paper speed of 400 m.min$^{-1}$, the blade angle being set to 30° with the paper. Water was progressively added to each composition until a coating was obtained which showed no signs of "streaking" or "spitting". The solids content of the composition which just achieved this result was recorded as the "runnable solids". The viscosity of this final composition was measured under low shear conditions by means of a Brookfield Viscometer at a spindle speed of 100 rpm, and by means of a Ferranti-Shirley Viscometer at a shear rate of 12800 s$^{-1}$.

The results obtained are set forth in Table 1 to be found at the end of this description.

The paper coating compositions prepared from the dry kaolin products from portions A, B and C were then coated at various coat weights on to the rotogravure base paper using the same laboratory paper coating apparatus at a paper speed of 400 m.min$^{-1}$ with the blade angle set at 45°. The coatings were dried and the coated paper was then calendered at a roll pressure of 500 psi (3.45 MPa) for 10 passes. The gloss, opacity and gravure print quality were then measured for each sample of coated paper and the results plotted graphically against coat weight. The values corresponding to a coat weight of 7 gm$^{-2}$ were found by interpolation.

The results obtained are set forth in Table II to be found at the end of this description.

The gloss measurements were performed according to TAPPI Standard No. T480ts-65 using a Hunterlab D16 gloss meter at an angle of incidence and measurement of 75° with the normal to the paper.

The opacity measurements were according to the method suggested by the manufacturers of the Elrepho brightness meter. The brightness meter is first zeroed using filter No. 12. A stack of paper sheets, thick enough to be completely opaque, is placed over the aperture of the brightness meter and the meter is adjusted to read 100 using filter No. 10. The stack is then replaced with a single sheet from the stack, backed with a black cavity, and the meter is read. Further readings are taken using different sheets from the stack, and the mean of ten readings is recorded.

The gravure print quality measurements are made according to the method described in the article "Realistic paper tests for various printing processes" by A. Swan, published in "Printing Technology", Vol. 13, No. 1, April 1969, pages 9–22. A gravure printing cylinder was used with an area of deeply etched calls to give a solid black area, and an area of less deeply etched cells to give a half-tone area. The half-tone area was used to estimate the percentage of gravure printing dots which were missing from the test print. This percentage is expressed as the gravure "print quality" and clearly the lowest value is the most desirable.

It can be seen that both the samples of kaolin which had been treated with the polyethylene diamine gave better results for gloss, opacity and rotogravure print quality than the untreated kaolin.

EXAMPLE 2 (Comparative)

An aqueous suspension was prepared containing 30% by weight of the same English kaolin clay as was used in Example 1, together with 0.3% by weight, based on the weight of dry kaolin clay, of a sodium polyacrylate dispersing agent. To a portion of this suspension was added 0.5% by weight, based on the dry kaolin, of the same polyethylene diamine as was used in Example 1 and the treated suspension was stirred for 10 minutes to ensure thorough mixing. It was observed, on adding sodium hydroxide to the suspension, that the viscosity of the suspension was very sensitive to pH, since the viscosity, as measured with a Brookfield Viscometer at a spindle speed of 10 rpm, fell from about 8000 mPa.s at a pH of 8.0 to 8.5 to about 20 mPa.s at a pH of about 10.

Two portions of the treated suspension were used, without preliminary filtering and drying, to prepare paper coating compositions of the type used for coated paper for rotogravure printing according to the same formula as was used in Example 1, except that, to the first portion, sufficient sodium hydroxide was added to raise the pH to 8.8, and, to the second portion, sufficient sodium hydroxide was added to raise the pH to 10.7. A portion of the untreated suspension was also used to prepare a similar paper coating composition, the pH in this case being raised to 9.0.

The "runnable solids" was determined for each paper coating composition as described in Example 1, and the compositions were then coated on to the same rotogravure base paper as was used in Example 1, and the gravure print quality, after calendering for 10 passes at a roll pressure of 500 psi (3.45 MPa) for a coat weight of 7 gm$^{-2}$ was determine for each composition as described in Example 1.

The results obtained are set forth in Table III to be found at the end of this description.

Also shown in Table III for comparison, are the results obtained for Portion B in Example 1, which is in accordance with the invention.

These results show that it is necessary to dewater the suspension of kaolin which has been treated with the polyethylene diamine before preparing a paper coating composition for a rotogravure printing paper if the best print quality is to be obtained.

EXAMPLE 3

An aqueous suspension containing 17.9% by weight of an English kaolin clay having a particle size distribution such that 71.3% by weight consisted of particles having an equivalent spherical diameter smaller than 2 μm, 52.3% by weight consisted of particles having an equivalent spherical diameter smaller than 1 μm and 31.8% by weight consisted of particles having an equivalent spherical diameter smaller than 0.5 μm, the kaolin being in a flocculated state as a result of the pH of the suspension being reduced to 3.6 by the addition of sulphuric acid, was treated with 0.4% by weight, based on the weight of dry kaolin, of the same polyethylene diamine which was used in Example 1. The polyethylene diamine was added in the form of a 2% by weight solution in water, and, after the addition, the suspension was stirred for 10 minutes to ensure thorough mixing. The suspension was then dewatered by filtration and the filter cake was dried to a water content of 10% by weight. The treated clay was found to give a 5 poise viscosity concentration in aqueous suspension at least 4 percentage units lower than that obtained with the untreated clay.

The treated kaolin was incorporated into a paper coating composition according to the formula given in Example 1 and this composition was used to prepare samples of coated rotogravure printing paper having a range of different coat weights, using the same base paper, laboratory paper coating apparatus and conditions as were described in Example 1. The runnable solids for the paper coating composition was determined and the gloss, opacity and gravure print quality of the samples of coated paper were measured and plotted graphically against coat weight. The values corresponding to a coat weight of 7 gm$^{-2}$ were determined by interpolation.

As a comparison, the experiment described above was repeated using a paper coating composition prepared from a portion of the kaolin suspension before treatment with the polyethylene diamine.

As a further comparison, the experiment was repeated using a paper coating composition of the same formulation but using as the pigment a known kaolin clay product intended for use in rotogravure compositions and prepared in accordance with the process described in GB-A-2058734. This kaolin product had a particle size distribution such that 43% by weight consisted of particles having an equivalent spherical diameter smaller than 2 μm, 26% by weight consisted of particles having an equivalent spherical diameter smaller than 1 μm and 14% by weight consisted of particles having an equivalent spherical diameter smaller than 0.5 μm.

The results obtained are set forth in Table IV to be found at the end of this description.

It can be seen that the product in accordance with this invention gives greatly improved gloss and opacity and a slightly better gravure print quality, as compared with the known product.

EXAMPLE 4

A further batch of 500 kg of kaolin treated in accordance with the invention and containing 10% by weight of water was prepared exactly as described in Example 3. The dried product was resuspended in water containing 0.3% by weight, based on the weight of dry kaolin, of a sodium polyacrylate dispersing agent and 0.05% by weight, based on the weight of dry kaolin, of sodium hydroxide to form a suspension containing 58.1% by weight of dry kaolin. This suspension was used to form a paper coating composition suitable for preparing a rotogravure printing paper according to the formula:

(a) 100 parts by weight kaolin;
(b) 4.5 parts by weight self-thickening acrylic latex;
(c) sufficient sodium hydroxide to raise the pH to 8.5.

The composition was coated on to a rotogravure base paper using commercial Jagenberg Combi-blade (trade mark) paper coating apparatus running at a paper speed of 600 m.min$^{-1}$. A suitable "runnable solids" was first determined by a method similar to that described in Example 1 at a blade tip angle of 35° and then paper coating composition at the runnable solids was applied to the base paper at a range of different coat weights using a blade tip angle of 55°. After the coated paper had been dried and calendered for 10 passes at 500 psi (3.45 MPa) the gloss, opacity and gravure print quality were measured and the results plotted graphically against coat weight. The values corresponding to a coat weight of 7 gm$^{-2}$ were determined by interpolation.

As a comparison the experiment was repeated using the same known kaolin product intended for use in rotogravure compositions as was described in Example 3.

The results obtained are set forth in Table V to be found at the end of this description.

TABLE I

| Portion | % by wt. of polyethylene diamine | Runnable solids (% by wt.) | Brookfield viscosity (mPa·s) | Ferranti-Shirley viscosity (mPa·s) | 5 Poise viscosity concentration |
|---|---|---|---|---|---|
| A | 0.16 | 49.3 | 760 | 39 | 63.2 |
| B | 0.48 | 50.4 | 840 | 55 | 58.9 |
| C | 0 | 50.3 | 1000 | 30 | 69.0 |

TABLE II

| Portion | % by wt. of polyethylene diamine | Gloss (TAPPI units) | Opacity (%) | Gravure print quality (% missing dots) |
|---|---|---|---|---|
| A | 0.16 | 54.5 | 86.7 | 2.0 |
| B | 0.48 | 54 | 87.2 | 2.0 |
| C | 0 | 52 | 85.9 | 2.5 |

TABLE III

| | % by wt. of polyethylene diamine | pH | Runnable solids (% by wt.) | Gravure print quality (% missing dots) |
|---|---|---|---|---|
| Comparative | 0 | 9 | 49.8 | 3.7 |
| Comparative | 0.5 | 8.8 | 46.5 | 2.6 |
| Comparative | 0.5 | 10.7 | 49.8 | 3.3 |
| Invention | 0.48 | 9 | 50.4 | 2.0 |

TABLE IV

| | % by wt. of polyethylene diamine | Runnable solids (% by wt.) | Gloss (TAPPI units) | Opacity (%) | Gravure print quality (% missing dots) |
|---|---|---|---|---|---|
| Invention | 0.4 | 48.5 | 52 | 86.4 | 0.9 |
| Untreated | 0 | 48.4 | 49 | 85.2 | 1.5 |
| Known product | 0 | | 42 | 85.5 | 1.0 |

TABLE V

| | % by wt. of polyethylene diamine | Runnable solids (%) | Gloss (TAPPI units) | Opacity (%) | Gravure print quality (% missing dots) |
|---|---|---|---|---|---|
| Invention | 0.4 | 53.2 | 47 | 90.8 | 0.6 |
| Known Product | 0 | 53.4 | 41 | 89.2 | 0.7 |

We claim:

1. A paper coating composition comprising, in aqueous suspension, an adhesive and a treated paper coating pigment prepared by the following process:
   (i) suspending a paper coating pigment in water to form a suspension containing at least 5% by weight of the pigment, the pH being adjusted, if necessary, to lie below 7.5;
   (ii) mixing with the suspension formed in step (i) a water-soluble organic compound having a plurality of primary and/or secondary amine groups and a number average molecular weight not greater than 1000; and
   (iii) at least partially dewatering the mixed suspension resulting from step (ii) to form a dewatered suspension of a treated paper coating pigment containing not more than about 30% by weight water;
   characterised in that the water soluble organic compound is added in step (ii) in an amount sufficient to decrease the 5 poise viscosity concentration of an aqueous suspension of the treated pigment relative to that obtained when the mixing step (ii) is omitted.

2. A paper coating composition according to claim 1, wherein the water soluble organic compound is added in step (ii) in an amount sufficient to decrease the 5 poise viscosity concentration of an aqueous suspension of the treated pigment by at least 4 percentage units relative to that obtained when the mixing step (ii) is omitted.

3. A paper coating composition according to claim 1, wherein the adhesive is of the latex variety, the latex being employed in an amount sufficient to provide in the range of from 4 to 8 parts by weight of latex solids to every 100 parts by weight of the inorganic material.

4. A paper coating composition according to claim 1, wherein the white particulate inorganic material is a clay mineral of the kandite group.

5. A paper coating composition according to claim 4, wherein the inorganic material is a kaolinitic clay having a particle size distribution such that from 65 to 80% by weight consists of particles having an equivalent spherical diameter smaller than 2 $\mu$m and from 10 to 30% by weight consists of particles having an equivalent spherical diameter smaller than 0.25 $\mu$m.

6. A paper coating composition according to claim 1, wherein the suspension formed in step (i) contains no more than 35% by weight of the dry inorganic material.

7. A paper coating composition according to claim 1, wherein the water soluble organic compound is selected from the group consisting of a polyethyleneimine, ethylene-diamine, diethylenetriamine, tetraethylenepentamine, 1, 12-dodecanediamine and hexamethylenetetramine.

8. A process for preparing a treated paper coating pigment comprising the following steps:
   (i) suspending a paper coating pigment in water to form a suspension containing at least 5% by weight of the pigment, the pH being adjusted, if necessary, to lie below 7.5;
   (ii) mixing with the suspension formed in step (i) a water-soluble organic compound having a plurality of primary and/or secondary amine groups and a number average molecular weight not greater than 1000; and
   (iii) at least partially dewatering the mixed suspension resulting from step (ii) to form a dewatered suspension of a treated paper coating pigment containing not more than about 30% by weight water;
   characterised in that the water soluble organic compound is added in step (ii) in an amount sufficient to decrease the 5 poise viscosity concentration of an aqueous suspension of the treated pigment by at least 4 percentage units relative to that obtained when the mixing step (ii) is omitted.

9. A paper coating composition according to claim 4, in which said clay mineral is selected from the group consisting of kaolinite, dickite, nacrite, and halloysite.

10. A paper coating composition according to claim 6, wherein the suspension contains from 8% to 20% by weight of the dry inorganic material.

11. A paper coating composition according to claim 1, wherein the water soluble organic compound is a polyethylene diamine which is prepared by the condensation of ethylenediamine with an ethylene dihalide or with formaldehyde.

* * * * *